United States Patent [19]

Loucks

[11] Patent Number: 5,455,678
[45] Date of Patent: Oct. 3, 1995

[54] METHOD FOR MOUNTING LIGHT VALVES FOR PROJECTION DISPLAY SYSTEM

[75] Inventor: Byran E. Loucks, Los Altos, Calif.

[73] Assignee: Kopin Corporation, Taunton, Mass.

[21] Appl. No.: 111,712

[22] Filed: Aug. 25, 1993

[51] Int. Cl.⁶ ........................................... G01B 11/00
[52] U.S. Cl. ................................. 356/400; 348/190
[58] Field of Search .................... 356/399–401, 356/153; 348/190

[56] References Cited

U.S. PATENT DOCUMENTS

| | | | |
|---|---|---|---|
| 4,864,390 | 9/1989 | McKechnie et al. | 358/60 |
| 4,904,061 | 2/1990 | Aruga . | |
| 4,909,601 | 3/1990 | Yajima et al. . | |
| 4,995,702 | 2/1991 | Aruga . | |
| 5,054,910 | 10/1991 | Kozaki et al. | 353/31 |
| 5,073,013 | 12/1991 | Sonehara et al. | 359/63 |
| 5,075,798 | 12/1991 | Sonehara et al. | 359/490 |
| 5,098,183 | 3/1992 | Sonehara | 353/31 |

FOREIGN PATENT DOCUMENTS

| | | |
|---|---|---|
| 595372A2 | 12/1990 | European Pat. Off. . |
| 450952A3 | 4/1991 | European Pat. Off. . |
| 526652A1 | 2/1992 | European Pat. Off. . |
| 1267587 | 10/1989 | Japan . |
| 4206331 | 7/1992 | Japan . |
| 89/09422 | 10/1989 | WIPO . |

*Primary Examiner*—Richard A. Rosenberger
*Assistant Examiner*—K. P. Hantis
*Attorney, Agent, or Firm*—Hamilton, Brook, Smith & Reynolds

[57] ABSTRACT

Liquid crystal display panels are mounted to a beam combining prism such that each display panel can flex in the place of the display panel as a result of thermal stresses. Mirrors having a cover glass plate substantially equivalent to the cover glass on the display panels are used to establish the image planes. A three-point clip mount for each display panel is then positioned based on the respective image plane. The mirrors are then replaced with the actual display panels and the optical system is then finely adjusted. After the fine adjustments, the mounting clips are bonded to the display panels.

20 Claims, 7 Drawing Sheets

METHOD FOR MOUNTING LIGHT VALVES FOR PROJECTION DISPLAY SYSTEM

BACKGROUND OF THE INVENTION

A color image can be synthesized by combining discrete primary color images (e.g., red, green and blue). In display systems using liquid crystal display panels, each primary color image can be generated by a respective display panel. The primary color images are then combined by an optical combiner to form a synthesized color image.

To synthesize an accurate color image, the display panels must be precisely aligned with respect to each other. The display panels must also be precisely aligned with the optical axis of the optical combiner. These alignments cannot be predetermined because there is a large tolerance in the optical properties of individual display panels.

In typical projection display systems using display panels, the display panels are fixed to a supporting structure of the display system. The beam combiner is then inserted in the optical path of the display panels. Such systems cannot be aligned until the display panels and beam combiner are fixed to the display system. Such systems contain many mechanical parts to facilitate image alignment between the optical combiner and the display panels. Assembly workers must have adequate skills to achieve the alignment after assembling the display system.

In projection display systems, the display panels are subjected to thermal stress. The thermal stress can misalign the display panels. A spatial misalignment of the display panels relative to each other or to the optical axis of the optical combiner can degrade the synthesized image.

SUMMARY OF THE INVENTION

Preferred embodiments of the invention are directed to projection display systems using light valve display panels to generate images. In particular, the light valve display panels are active matrix liquid crystal display panels. The active matrix circuitry is preferably fabricated on a single semiconductor wafer. In a preferred embodiment, the display panels are approximately the size of a standard 35 mm photographic slide. As will be apparent, the utility of the invention is applicable to other display panels, including Electroluminescent (EL) display panels, Light-Emitting Diode (LED) arrays, and flexing mirror pixel light valves. Furthermore, the display panel size is not limited to the 35 mm format, other dimensions and aspect ratios can also be used in practicing the invention.

In a preferred embodiment, three display panels are mounted to and aligned with a beam combiner so that when images produced on the display panels are projected onto a screen, the resulting image is in focus and registration for all colors. A preferred embodiment benefits from a low product component cost, a compact assembly, and an alignment process that requires no subjective decisions on the part of a person performing the alignment.

In general, a preferred method results in a sub-assembly consisting of three display panels attached to a beam combining prism and aligned so that from a projection lens all three display panels and the lens are on a common optical axis and aligned laterally and rotationally about the optical axis to a common orientation. This sub-assembly has appropriate reference surfaces to orient the sub-assembly properly relative to a projection lens and an illumination system without requiring any further adjustments.

A preferred method of the invention contains three major steps. In the first step, mounting brackets are installed on the beam combining prism. In the second step, image plane mounting clips are fastened to the combining prism mounting brackets. Finally, the display panels are aligned and bonded to the image plane mounting clips.

A preferred embodiment of the invention is a light valve display system containing light valve display panels and a beam combiner sub-assembly. A plurality of light valve display panels generate respective images and the beam combiner combines the images to form a synthesized image. Each light valve display panel is mounted to the beam combiner by a three point mount.

The three points define a display panel image plane. Mounting clips provide for expansion of each display panel in response to thermal stress. Each display panel can expand in a direction normal to the optical axis of the respective display panel. Because the display panels are in close proximity to each other, the display panels function in a shared environment. As such, the temperature of each display panel will be substantially equal to the temperature of the other display panels. Thus, each display panel will be subjected to equivalent amounts of thermal stress and consequently, the display panels will expand in equal amount in response to the thermal stress.

A mounting contact point is located near a respective corner of each display panel. A first structure at the inner contact point is rigid in all directions. A second structure at each of the outer contact points is rigid in one direction in the image plane and flexible in the other direction in the image plane. The corner of the display panel that is diagonal to the first structure is unsupported.

By mounting aligned display panels to the optical combiner, a complete display panel assembly is fabricated. Such an assembly permits the use of smaller beam combiners and display panels than can be used in prior art systems. In addition, the number of mechanical parts that must be supplied with each projection display system and the skill level required to assemble projection display systems is reduced over prior art systems.

BRIEF DESCRIPTION OF THE DRAWINGS

The above and other features of the invention, including various novel details of construction and combination of parts, will now be more particularly described with reference to the accompanying drawings and pointed out in the claims. It will be understood that the particular method of mounting display panels embodying the invention is shown by way of illustration only and not as a limitation of the invention. The drawings are not necessarily to scale, emphasis instead being on illustrating principles and features of the invention. The principles and features of this invention may be employed and varied in numerous embodiments without departing from the scope of the invention.

DETAILED DESCRIPTION OF A PREFERRED EMBODIMENT OF THE INVENTION

Figure 1:
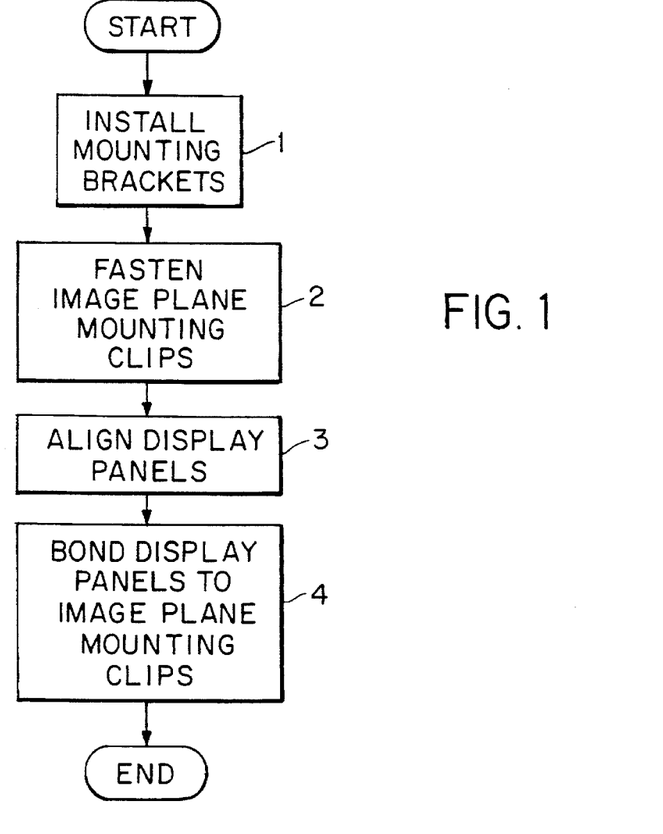
FIG. 1 is a flowchart illustrating the steps for mounting and aligning a light valve display panel with a beam combiner.

FIG. 1 is a flowchart illustrating the main steps in mounting and aligning a display panel to an optical beam combiner. At step 1, mounting brackets are installed on a beam combining prism., At step 2, image plane mounting clips are fastened to the combining prism mounting brackets to establish the image planes. At step 3, the display panels are aligned. At step 4, the display panels are bonded to the respective image plane mounting clips. Each of these steps will be described in more detail below.

A beam combining prism 10 does not have any means of mounting or any reference surfaces except four polished faces 10a, 10b, 10c and 10d. The beam combining prism 10 can have any desired aspect ratio or orientation. In a specific embodiment, a marking indicates which three face 10, 10b, 10c are input faces and which faces 10d is the output face. A fixture is used to hold the prism 10 in a particular orientation relative to a reference surface 100 on the fixture. The same fixture also locates two metal mounting brackets 18, 19 to capture the prism. The brackets are parallel to the two non-polished surfaces 10e, 10f of the prism. In this fixture, the two mounting brackets 18, 19 are cemented to the prism 10. The adhesive used to cement the mounting brackets 18, 19 to the prism 10 can be chosen from a variety of adhesives commonly used in the optical industry to bond metal to glass.

Figure 2A:
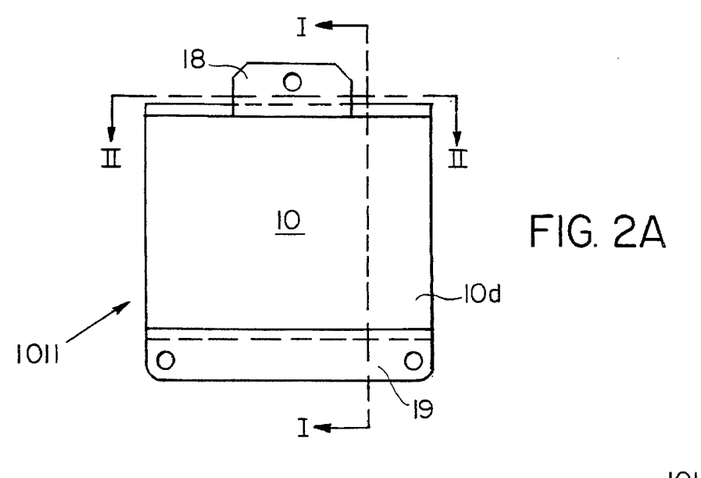
FIGS. 2A–2C are schematic diagrams of a beam combiner assembly.
Figure 2B:
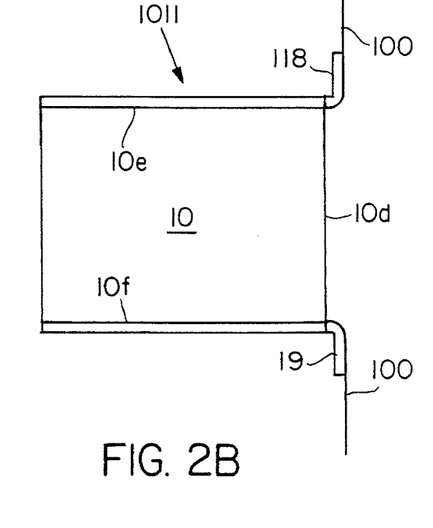
Figure 2C:
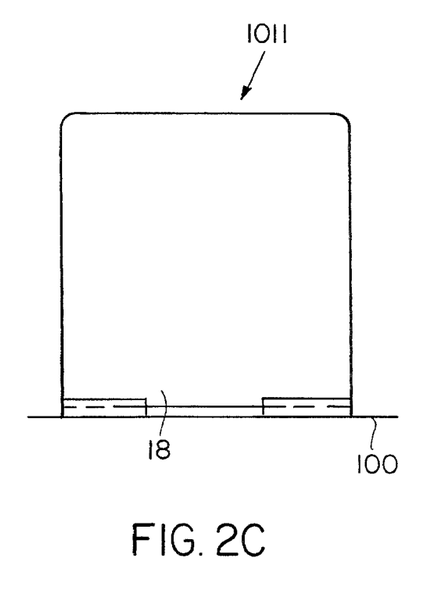

FIGS. 2A–2C are schematic diagrams illustrating the prism 10 and mounting brackets 18, 19 bonded together. FIG. 2A is a front view of the sub-assembly 1011 showing a reference surface 100. The final display panel assembly is coupled to a projection display system at the reference surface 100. Holes in the mounting brackets 18, 19 are locational and holding provisions. The reference surface 100 is parallel to the output face 10d of the prism 10. FIG. 2B is a schematic diagram of the beam combiner sub-assembly 1011 taken along line I—I of FIG. 2A. FIG. 2C is a schematic diagram of the beam combiner sub-assembly 1011 taken along line II—II of FIG. 2A. As illustrated, the mounting brackets 18, 19 cover respective unpolished faces 10e, 10f of the prism 10. It is understood that less than full coverage can be obtained without affecting the scope of the invention.

Figure 3A:
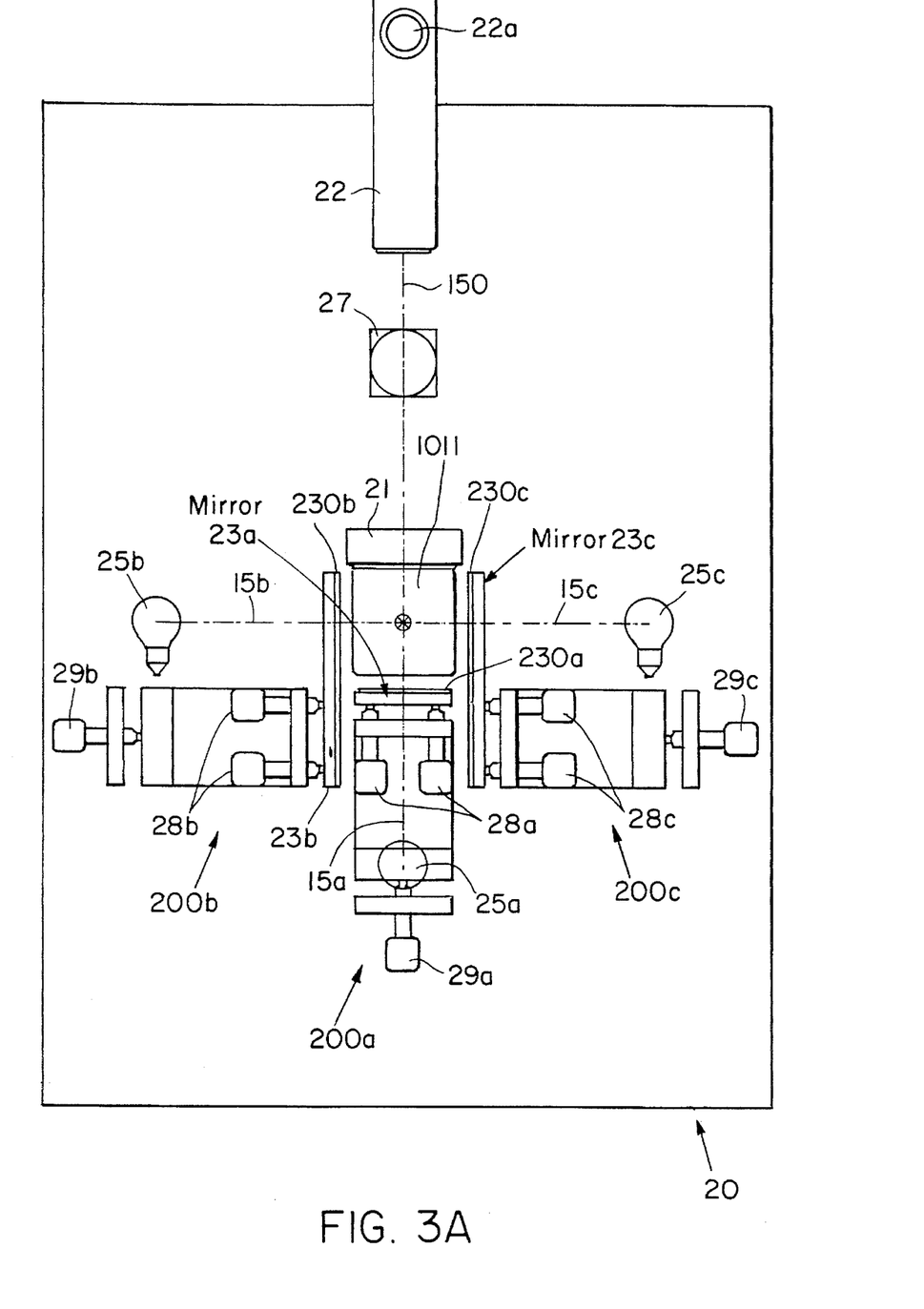
FIGS. 3A–3B are schematic diagrams of a image plane alignment fixture.
Figure 3B:
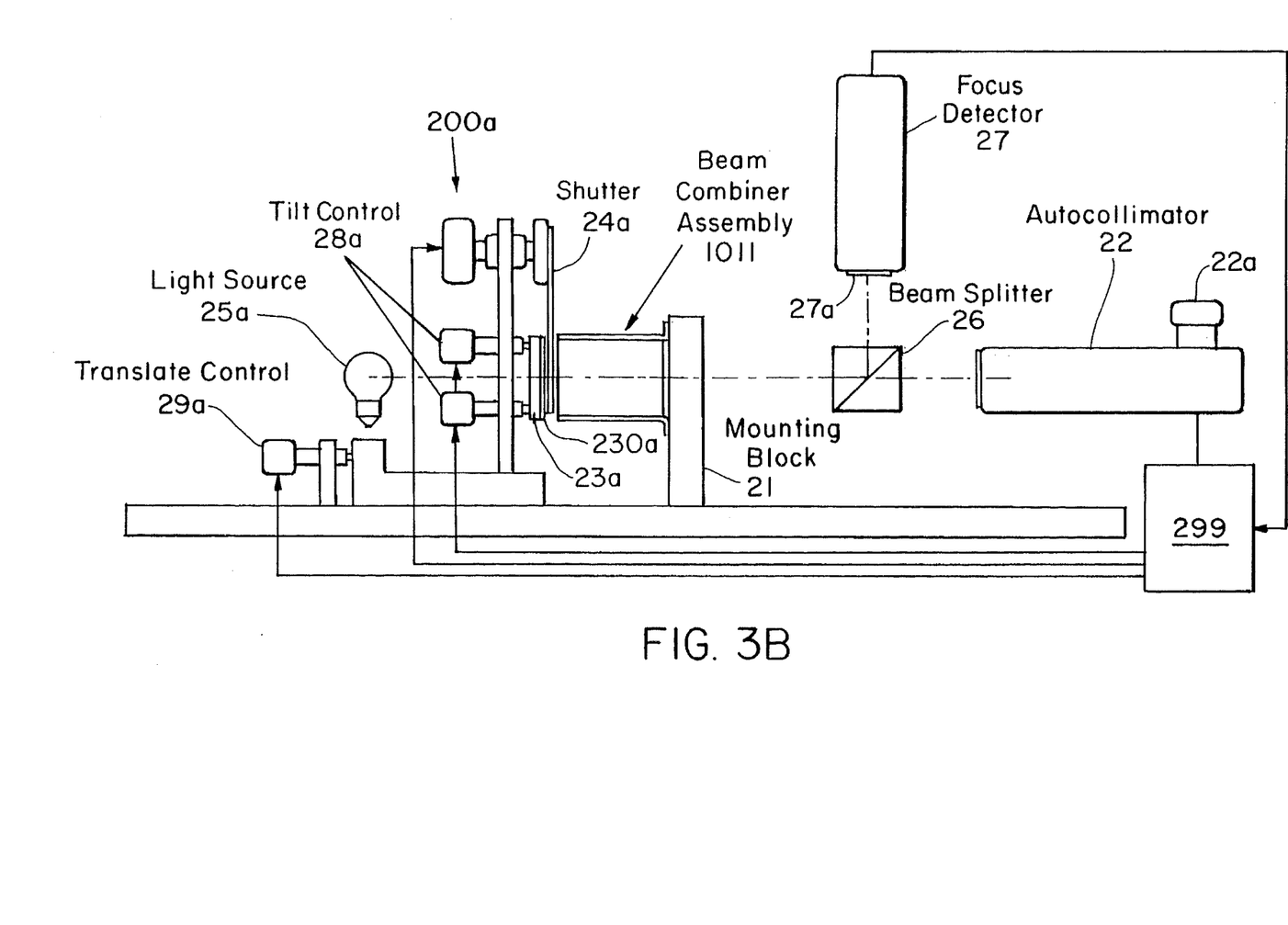

After the prism 10 has been bonded to the metal mounting brackets 18, 19, the beam combiner sub-assembly 1011 is transferred to a fixture where image plane mounting clips 12, 13, 14 (shown in FIG. 4) are attached to the mounting brackets 18, 19. The purpose of the clips 12, 13, 14 is to provide an image plane established by three points for each display panel 1000. Each image plane must be optically perpendicular to the reference plane 100 established by the mounting brackets 18, 19 holding the prism 10. In addition to being perpendicular to the optical axis, the image planes must also be located at the same optical distance along the optical axis relative to the reference plane 100. A first fixture 20 shown in FIGS. 3A–3B is used to establish the proper image planes. FIG. 3A is an elevated plan view of the fixture 20. FIG. 3B is a side plan view of one stage 200a of the fixture 20.

The fixture 20 contains a block 21 for mounting the beam combiner sub-assembly 1011, an autocollimator 22, three mirrors 23a–23c, three shutters 24a–24c, three light sources 25a–25c, a beamsplitter 26, and a focus detection module 27. The autocollimator 22 is aligned perpendicular to the reference surface 100 of the prism mounting brackets 18, 19 and establishes the direction of the optical axis 150. The three mirrors 23 are mounted on stages that permit motion of the mirrors 23 in two tilt axes around the mirror surface and longitudinally along the direction perpendicular to the mirror surface. The three mirrors 23 provide a return beam for each of the three light paths to the autocollimator 22. The shutters 24 permit separate observation of each light path. The light sources 25 are used in the distance setting portion of the alignment process, as are the beamsplitter 26 and the focus detection module 27.

In operation, the shutter 24a to one of the mirrors 23a is opened and the reflection from the mirror 23a is observed in the autocollimator 22. Tilt adjustment controls 28a for that mirror 23a are adjusted until the return beam is parallel to the output beam of the autocollimator 22. This indicates the mirror 23a is perpendicular to the respective optical axis 15a. The perpendicularity may be set to any desired degree of precision because the autocollimator 22 is a calibrated instrument able to measure angles at least to the arc second range. This process is repeated for each of the mirrors 23b, 23c in sequence. When that process is complete, all three mirrors 23 are perpendicular to the optical axis 150 of the system, but the distance from the reference surface 100 to the mirrors 23 is not yet fixed.

To fix the distance from the reference surface 100 to the mirrors 23, a feature is required on each mirror 23. This feature takes the form of a pattern etched through the reflective coating on the mirrors 23 so light can pass through the mirror substrate. The light sources 25 provide the light for this purpose. The light from the light sources passes through each mirror (again this is done one mirror 23 at a time). The light then passes through the beam combiner 10 along the optical axis 15, 150 and reaches the beamsplitter 26 from which light from the reflected path enters the focused detection module 27. The focus detection module 27 has a lens 27a that makes an image of the mirror pattern. The focus detection module 27 then examines this image for quality of focus. The stage 200a holding the mirror 23a is then translated longitudinally by a respective translation control 29a until the focus detection module 27 indicates acceptable focus. The precision of focus can be quantified so no operator judgment is required.

As illustrated, in a preferred embodiment in FIG. 3B, the alignment process can be conducted automatically, instead of manually. In this emodiment a programmable computer 299 is coupled to the autocollimator 22, the focus detector 27, the adjustment controls 28, the translator controls 29, and the shutters 24. The computer 299 controls operation of the shutters 24. In response to signals from the autocollimator 22, the tilt adjustment controls 28 are actuated by the computer 299. In response to signals from the focus detector 27, the translator control 29 is actuated by the computer 299. In a preferred embodiment, the controls 28, 29 and the shutters 24 are actuated by a servo mechanism.

At this point, an image surface for each display panel 1000 has been established that is perpendicular to the respective optical axis 15 and at a common optical distance from the beam combiner reference surface 100. The mirror surfaces correspond to the image surfaces. The mirror surfaces cannot be used to locate the image plane mounting clips 12, 13, 14 because the image surface of the display panel 1000 is not on the surface of the display panel 1000.

Thus, the mirror surface location is not the proper location to locate the image plane mounting clips 12, 13, 14.

It should be noted that mirrors 23 are used instead of the display panels 1000 in a preferred embodiment. This is because there typically is little probability that the display panels 1000 are flat enough to give an adequate return beam for the autocollimator 22. In comparison, the mirror surfaces can be ground to an adequate flatness.

In a preferred embodiment of the invention, the mirrors 23 are modified so that there is a clear glass plate 230 bonded to the reflecting surface of the mirrors 23. This glass plate 230 must have an optical and a mechanical thickness equal to the front cover of the display panel 1000, within a degree of precision determined by the requirements of the particular projection lens to be used in the target projection display system. Any error between the glass plate and the front cover can be compensated for by the fixture 20. By so modifying the mirrors 23, the mirror surfaces establish the proper image planes for the display panels 1000.

In a projection display system, the projection lens may suffer from lateral color displacement. The lateral color displacement can be corrected by altering the magnification of the display panel image. Given a projection lens, the displacement of the image plane from the optimal focal point can be calculated for each color image. This displacement can then be used to adjust the translation controls 29. Further details regarding a preferred projection system can be found in U.S. Ser. No. 08/015,813 filed on Feb. 10, 1993, which is incorporated herein by reference.

The correction for lateral color displacement is a compromise between focus and magnification. In a preferred embodiment of the invention, the displacement of each display panel from optimal focus is less than 0.5 mm. In addition, it should be noted that correction of lateral color displacement of telecentric lenses may substantially degrade the focus of the synthesized image so that the degree of the correction desireable will depend upon optimal focus.

The mechanism for transferring the located image planes to the mounting brackets 18, 19 of the beam combining prism 10 consist of three clips, the image plane mounting clips 12, 13, 14. Each clip 12, 13, 14 has a flat surface to be bonded to a prism mounting bracket 18, 19 and a spherical surface to be bonded to a display panel 1000. Three clips 12, 13, 14 are used for each display panel 1000. The clips 12, 13, 14 are mounted to the prism mounting brackets 18, 19 so the spherical surfaces are in contact with the mirror plates 23 and positioned so they contact the display panels 1000 near three of the four corners when they are installed. Three contact points are used to avoid stressing the display panels 1000 when they are mounted.

Of the three clips 12, 13, 14 used for each display panel 1000, a first clip 12 is designed to be stiff along the display panel surface in all directions, a second clip 13 is stiff in one direction in the image plane and slightly flexible in the perpendicular direction in the image plane, and a third clip 14 is flexible and stiff in the opposite directions to the second clip 13. This clip stiffness pattern permits the display panel 1000 to be mounted so the first clip 12 establishes the location of the display panel 1000 while the other two clips 13, 14 provide support for the display panel 1000 but permit some slight differential thermal expansion during warmup. This differential expansion occurs because the thermal conductivities of the glass and the metal components are different, even if the thermal expansion coefficients are about equal. A differential expansion for each display panel 1000 should be substantially equal to the differential expansion in each other display panel 1000 in a completed assembly because the display panels 1000 experience substantially the same thermal stress. The display panels 1000 experience the same thermal stress because to the display panels 1000 function in a common environment due to the close proximity of the display panels.

Figure 4:
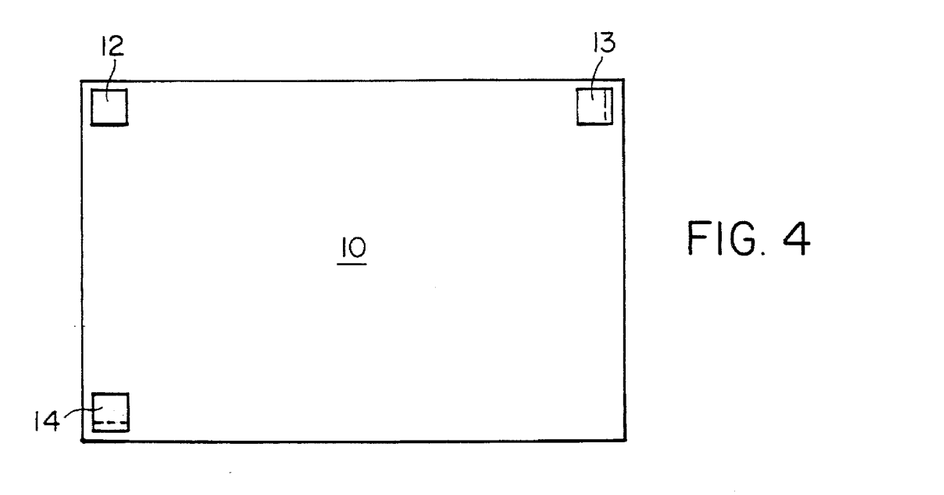
FIG. 4 is a schematic diagram illustrating mounted image plane mounting clips.

FIG. 4 illustrates the mounted positions of the image plane mounting clips 12a, 13a, 14a for one input face 10a of the beam combining prism 10. It should be noted that the positioning of the image plane mounting clips 12, 13, 14 for all three input faces 10a, 10b, 10c must be aligned such that the projection of each image plane mounting clip 12, 13, 14 aligns with the corresponding image plane mounting clips 12, 13, 14. In other words, all projections of the first clips 12 must align with each other, all projections of second clips 13 must align with each other, and all projections of third clips 14 must align with each other.

A mechanism locates the clips 12, 13, 14 so they contact the glass plate 230 covering the mirror 23 with the spherical surface and at the same time contact the respective prism mounting bracket 18, 19 with the flat surface. In a preferred embodiment, the clips 12, 13, 14 are pivot-mounted to the mounting brackets 18, 19 and the clips 12, 13, 14 are pivoted into position. When this contact is achieved, the clips 12, 13, 14 are bonded to the mounting brackets 18, 19. The clips can be bonded to the mounting brackets 18, 19 by a variety of methods, including either spot welding or ultra-violet-activated structural adhesive bonding. In a preferred emodiment, the adhesive is Locktite Impruved 365.

If the display panels 1000 were to be fastened to the clips 12, 13, 14 at this point in the process, an image would appear on the screen that was in good focus over the whole area and for each color. However image may require registration between the image and screen boundaries or of color to color. Registration of the images requires the ability to move the display panels 1000 in the plane of the display panel image. As before, this registration can be performed one light path at a time.

Figure 5A:
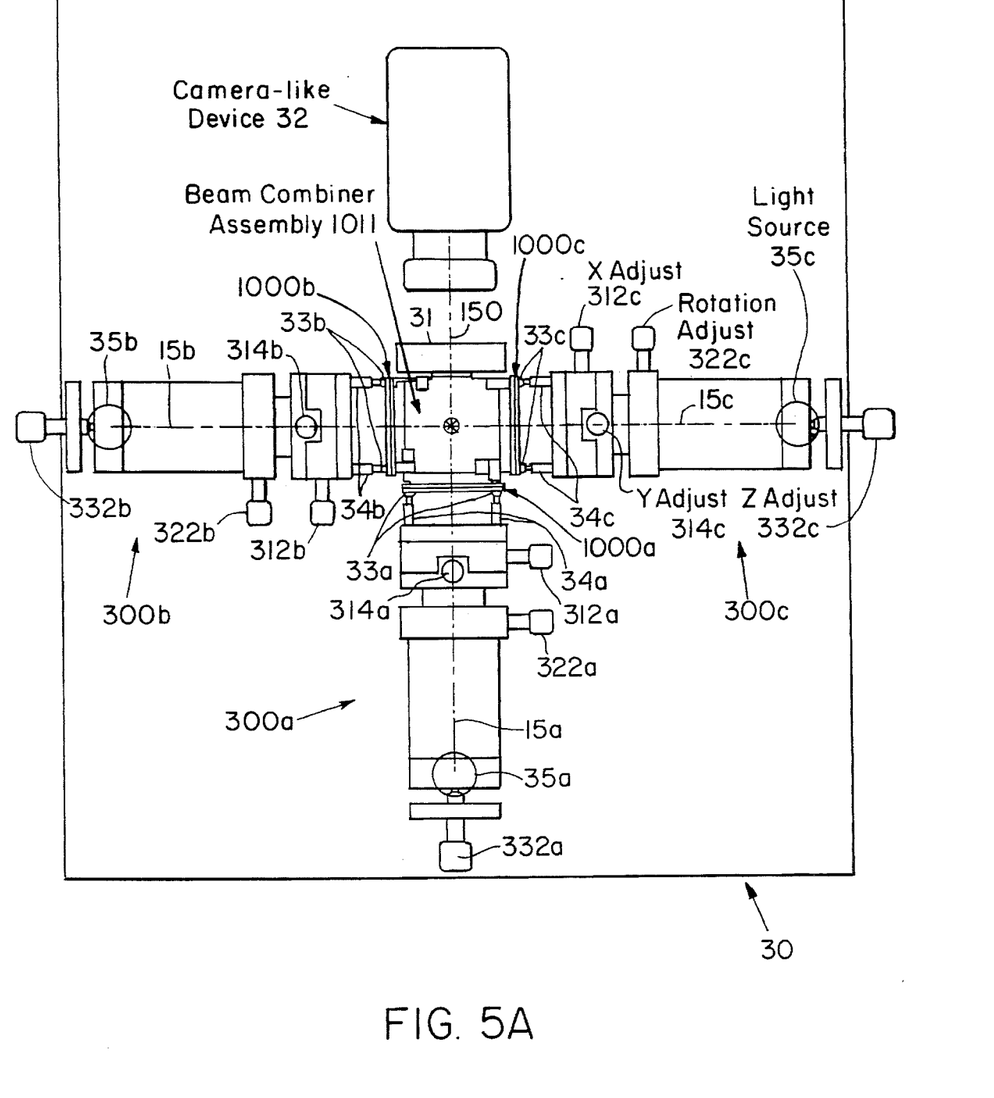
FIGS. 5A–5B are schematic diagrams illustrating the display panel locating fixture.
Figure 5B:
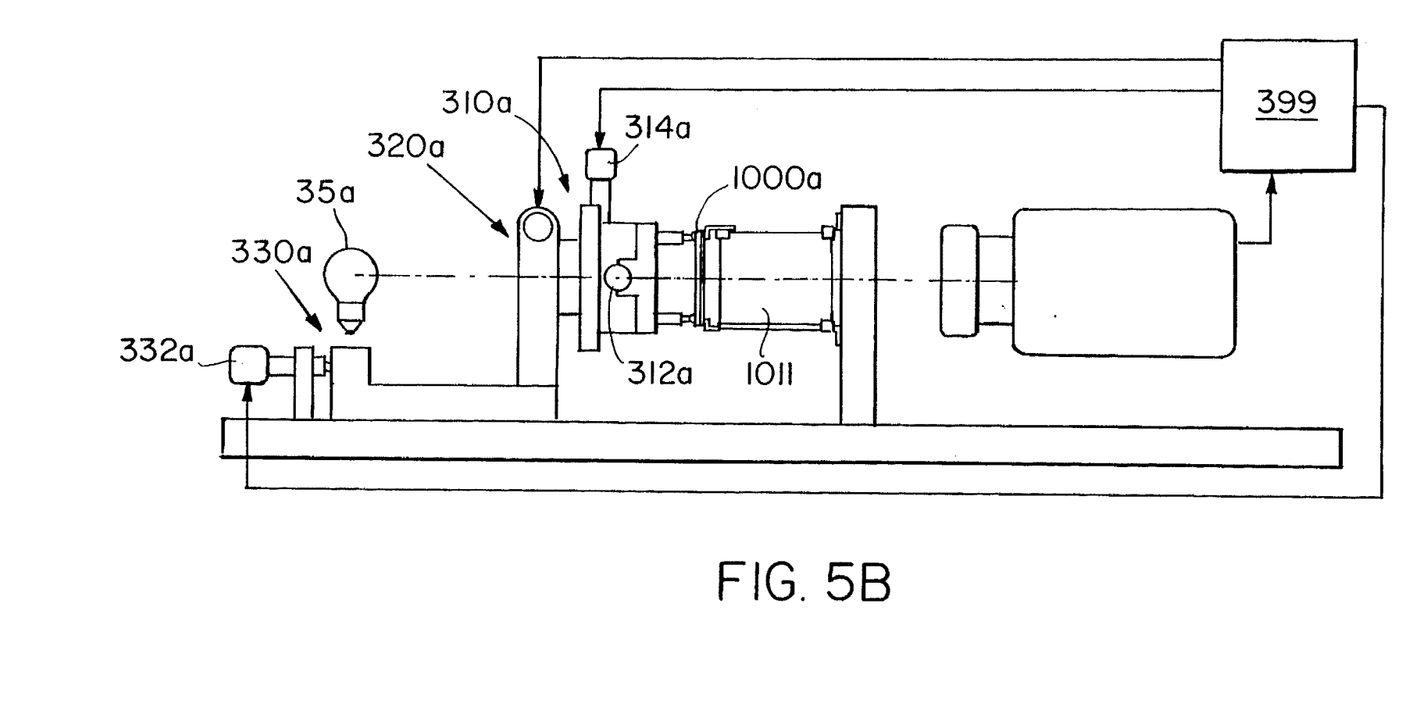

A second fixture 30, similar to the first fixture 20 used to mount the image plane mounting clips 12, 13, 14, is used to mount the display panels 1000 to the beam combiner subassembly 1011. FIG. 5A is an elevated plan view of the second fixture 30. FIG. 5B is a side plan view of the stages of the fixture 30 for one display panel 1000a. In this fixture 30, there is a mount 31 for the beam combining prism 10 using the same reference surface 100 as before. A stage 300 for each display panel 1000 moves in three orthogonal directions and rotates the display panel about the optical axis 150 of the system. A camera device 32 examines the images on the display panels 1000.

A set of vacuum cups 33 are used to hold onto each display panel 1000. The vacuum cups 33 are mounted on the ends of spring-loaded shafts 34, which permit the vacuum cups 33 to move independently along their own longitudinal axes. The vacuum cup assembly is mounted to an x-y stage 310, which is in turn mounted to a rotational stage 320, which is mounted to a z travel stage 330. In operation, the z travel is activated to cause the display panel 1000 contact the image plane mounting clips 12, 13, 14. The spring-loaded shafts 34 extending the vacuum cups 33 must collapse sufficiently to permit the display panel 1000 to contact all three clips 12, 13, 14 simultaneously. At this point, the light source will illuminate the display panel 1000 and an image will be formed in the camera device 32.

The camera device 32 can be a television camera, preferably using a Charged-Coupled Device (CCD) array, with electronics to identify the output from any desired pixel in the array. The image seen by the CCD array can be that of an activated display panel 1000 or of a fixed pattern built into the masking around the periphery of the display panel. In any case, for a properly aligned display panel, the image of that pattern will match certain specified pixels on the CCD array. The method of alignment is to move the x, y, and rotation controls until the correct alignment is achieved. The amount of motion required is small because the display panel 1000 will be nearly in the correct position when installed into the device because of the locational features built into the fixtures. This will permit a large enough magnification of the display panel pattern at the CCD array to allow the use of a low-resolution CCD array even with a high resolution display panel 1000.

As illustrated, a computer 399 is coupled to the camera device 32, the x, y and rotational controls 312, 314, 322, and the translation control 332. In response to signals from the camera device 32, the computer 399 actuated the x, y and rotational controls 312, 314, 322 and the translation controls 332. In a preferred embodiment, the controls 312, 314, 322 332 are servo mechanisms.

After the alignment has been achieved for all three display panels 1000, an ultraviolet curing adhesive that was put on the spherical surfaces of the image plane mounting clips 12, 13, 14 is cured and the completed assembly is removed from the fixture 30.

Figure 6A:
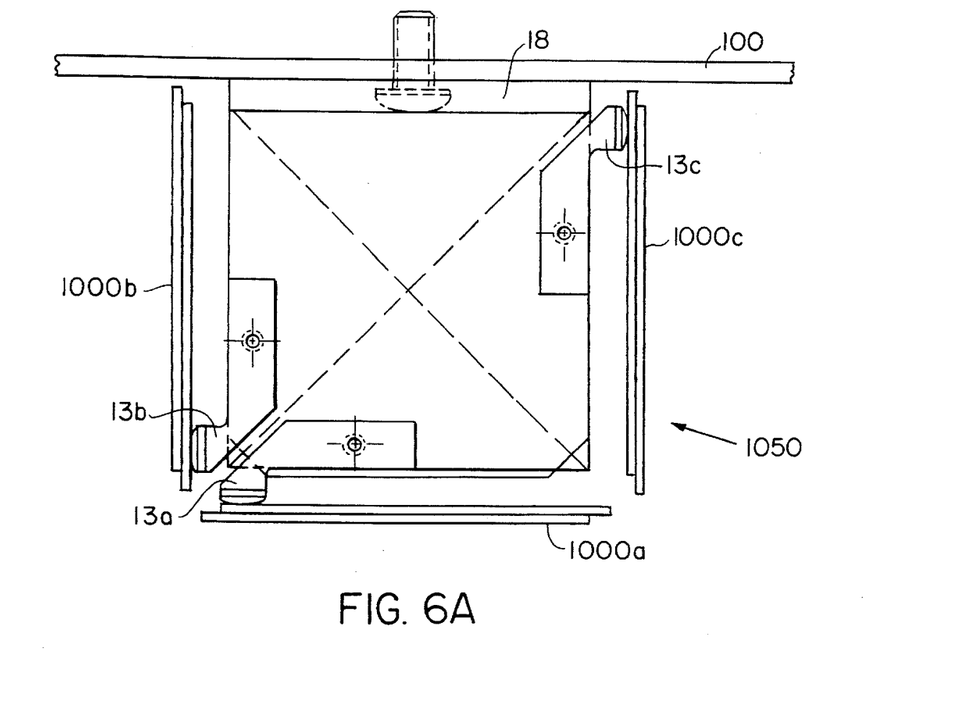
FIGS. 6A–6B are schematic diagrams of a completed display panel and beam combiner assembly.
Figure 6B:
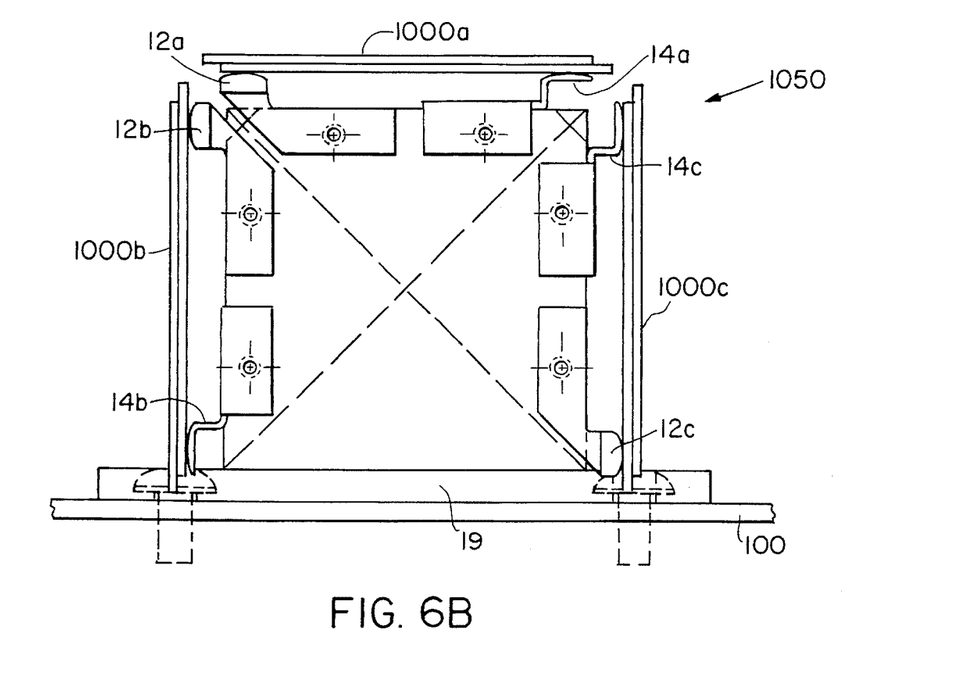

FIGS. 6A–6B illustrate a completed assembly of display panels 1000, beam combining prism 10, and mounting brackets 18 and 19. Illustrated are three display panels 1000a, 1000b, 1000c mounted to the beam combiner assembly 1011 by respective clips 12, 13, 14. For purposes of clarity in the drawings, each view illustrates only those clips 12, 13, 14 that are in the foreground. Thus, it may appear that some edges of the display panels 1000 are unsupported. However, only one corner of each display panel 1000 is in fact unsupported. FIG. 6A is an plan view of the display panel assembly 1050 facing the first mounting bracket 18. As illustrated, the respective second mounting clips 13 fixed to the first mounting bracket 18. Not shown in FIG. 6A are the first mounting clips 12 and third mounting clips 13. FIG. 6B is a plan view of the display panel assembly 1050 facing the second mounting bracket 19. As illustrated, the respective first mounting clips 12 and third mounting clips 14 are fixed to the second mounting bracket 19. Not shown in FIG. 6B are the second mounting clips 13.

The use of a spherical surface at the display panel/clip interface is useful for more than just establishing three points to form the display panel image plane. When the display panel 1000 is bonded to a clip, the bond line at the contact point is close to zero thickness. If this were the only bond point, the joint would probably fail with temperature cycling because there would be no adhesive thickness to distribute the shear forces between the display panel 1000 and clip. The spherical surface provides a varying thickness of adhesive to survive such shear forces.

In both the first fixture 20 and the second fixture 30, there is a very large central aperture relative to the outside dimensions of the workpiece. All adjustments are conducted at the edge of the workpiece. Due to the small size of the display panels 1000 (and thus the mirrors 23), there is only about a ½–¾" overhead around the periphery of the workpiece in which adjustments can be made.

Equivalents

Those skilled in the art will know, or be able to ascertain using no more than routine experimentation, many equivalents to the specific embodiments of the inventions described herein.

These and all other equivalents are intended to be encompassed by the following claims.

The invention claimed is:

1. A method of mounting a light valve display panel to an optical beam combiner, comprising the steps of:

providing a light valve display panel;

positioning a mirror surface relative to the beam combiner such that an optical plane is established as defined by the position of the mirror surface;

attaching a plurality of mounting clips to the beam combiner such that each mounting clip has a contact point in the optical plane; and attaching the light valve display panel to the contact points of the mounting clips.

2. The method of claim 1 further comprising, before the step of attaching the light valve display panel, the step of adjusting the position of the light valve display panel relative to the beam combiner to generate a focused image from the beam combiner.

3. The method of claim 1 further comprising attaching the clips to the beam combiner with an adhesive.

4. The method of claim 1 further comprising attaching the light valve display panel to the contact points with an adhesive.

5. The method of claim 1 further comprising providing a plurality of at least three mounting clips to attach the light valve display panel.

6. The method of claim 1 further comprising providing a plurality of light valve display panels to be positioned relative to the beam combiner.

7. The method of claim 1 further comprising providing a light source, an autocollimator and a detector to measure the position of the beam combiner relative to the light valve display panel.

8. A method of mounting a light valve display system to an optical beam combiner, comprising the steps of:

providing first, second and third light valve display panels;

positioning first, second and third locating surfaces relative to the beam combiner such that first, second and third optical planes are established as defined by the position of the each locating surface, respectively;

attaching a plurality of mounting elements to the beam combiner such that each mounting element has a contact point in one of the first, second or third optical planes; and attaching the first, second and third light valve display panels to the contact points of the mounting elements.

9. The method of claim 8 further comprising, before the step of attaching each light valve display panel, the step of adjusting the position of each light valve display panel relative to the beam combiner to generate a focused image from the beam combiner.

10. The method of claim 8 further comprising attaching the elements to the beam combiner with an adhesive.

11. The method of claim 8 further comprising attaching each light valve display panel to the contact points with an adhesive.

12. The method of claim 8 further comprising providing a plurality of at least three mounting elements to attach each light valve display panel.

13. The method of claim 8 further comprising providing a light source, an autocollimator and a detector to measure the position of the beam combiner relative to each light valve display panel.

14. A method of mounting a light valve display panel to an optical beam combiner, comprising the steps of:

providing a light valve display panel;

positioning a locating surface relative to the beam combiner;

measuring light transmitted through the beam combiner and electronically actuating movement of the locating surface such that an optical plane is established as defined by the position of the locating surface;

attaching a plurality of mounting elements to the beam combiner such that each mounting element has a contact point in the optical plane; and attaching the light valve display panel to the contact points of the mounting elements.

15. The method of claim 14 further comprising, before the step of attaching the light valve display panel, the step of adjusting the position of the light valve display panel relative to the beam combiner to generate a focused image from the beam combiner.

16. The method of claim 14 further comprising attaching the clips to the beam combiner with an adhesive.

17. The method of claim 14 further comprising attaching the light valve display panel to the contact points with an adhesive.

18. The method of claim 14 further comprising providing a plurality of at least three mounting clips to attach the light valve display panel.

19. The method of claim 14 further comprising providing a plurality of light valve display panels to be positioned relative to the beam combiner.

20. The method of claim 14 further comprising providing a light source, an autocollimator, a detector, a programmable computer electronically connected to the autocollimator and detector to measure the position of the beam combiner relative to the light valve display panel and to actuate movement of the mounting position of the display panel with a servo-mechanism.

* * * * *